United States Patent [19]

Melchior

[11] Patent Number: 5,112,408
[45] Date of Patent: May 12, 1992

[54] ROOFING TILE ASSEMBLY

[75] Inventor: Bernd Melchior, Remscheid, Fed. Rep. of Germany

[73] Assignee: BMC Melchior Solartechnik KG, Remscheid, Fed. Rep. of Germany

[21] Appl. No.: 648,489

[22] Filed: Jan. 31, 1991

[30] Foreign Application Priority Data

Jan. 31, 1990 [DE] Fed. Rep. of Germany ....... 4002711

[51] Int. Cl.$^5$ .................... H01L 31/048; E04D 13/18
[52] U.S. Cl. .................................. 136/251; 136/244; 136/291; 52/173 R; 52/519; 126/DIG. 2
[58] Field of Search ........................ 136/244, 251, 291; 52/173 R, 518-519, 541, 522; 126/DIG. 2

[56] References Cited

U.S. PATENT DOCUMENTS

| 4,670,293 | 6/1987 | Yamano et al. ........................ 427/39 |
| 4,886,554 | 12/1989 | Woodring et al. ................... 136/244 |
| 4,946,512 | 8/1990 | Fukuroi et al. ....................... 136/248 |

FOREIGN PATENT DOCUMENTS

| 1900069 | 9/1970 | Fed. Rep. of Germany ...... 136/251 |
| 2806810 | 8/1979 | Fed. Rep. of Germany ...... 136/291 |
| 2818474 | 10/1979 | Fed. Rep. of Germany ...... 136/251 |
| 3715535 | 11/1988 | Fed. Rep. of Germany ...... 136/291 |
| 2478167 | 9/1981 | France ................... 136/251 |

Primary Examiner—Aaron Weisstuch
Attorney, Agent, or Firm—Herbert Dubno

[57] ABSTRACT

Tile plates of standard roofing tile dimensions can engage over opposite edges of photovoltaic modules mounted on these plates to form roofing assemblies. The photovoltaic modules preferably are frameless and are anchored by formations on their edges to formations along grooves of the tile plates receiving them.

19 Claims, 4 Drawing Sheets

ROOFING TILE ASSEMBLY

FIELD OF THE INVENTION

My present invention relates to a roofing tile assembly, i.e. a roofing tile or plate which may be comprised of clay, ceramic, concrete, synthetic resin or composite rigid materials, carrying on its upper surface a solar plate with photovoltaic solar cells.

BACKGROUND OF THE INVENTION

The integration of photovoltaic structures in architecture with commercial modules has created numerous technical and optical problems which are dealt with, for example, in German patent documents DE 19 00 069, DE-GM 79 20 669, DE 34 19 299, DE GM 82 12 100 and DE 33 37 658. For fastening conventional photovoltaic modules, fastening elements passing through the roof covering and to the supporting roof construction must be mounted on fastening devices and must be individually designed for the particular roof covering system which is used. Standardization, which is difficult and hardly sensible in view of the relatively small numbers of pieces which had to be provided, was not practical. The fastening of commercial photovoltaic modules required a storm-resistant anticorrosion construction which was so attached that it would not loosen in the course of time and generate flapping noises in the wind.

Whenever a fastening device passed through a conventional roof covering, sealing problems were encountered. Indeed, the long-term tightness of a roof covering traversed by such fastening elements could not be guaranteed because of the daily thermal stresses and changes resulting from aging of the roof. The fastening techniques employed were costly, involved large labor costs and required specially trained personnel.

In addition, existing technology often provided aesthetically unacceptable photovoltaic modules which did not harmonize with the traditional roof covering. For example, the photovoltaic module was often of a blue or black coloration and in commercial systems was surrounded by a silver or colored frame, neither of which harmonized with the color scheme of conventional roof coverings. Because of these problems, mass production of photovoltaics to reduce costs of application of photovoltaic units to existing roof coverings did not materially progress in recent years.

OBJECTS OF THE INVENTION

It is the principal object of the present invention to provide a roofing tile assembly which overcomes the aforedescribed drawbacks and enables wide-spread application of photovoltaic technology to roof structures.

Another object of my invention is to provide a roofing tile or roofing slate which is of simple construction, which is easy to manufacture and mount and which enables optical integration of a photovoltaic unit into the architecture of which the roof forms a part.

SUMMARY OF THE INVENTION

These objects are attained, in accordance with the invention, in a roofing tile assembly having a rigid roofing tile on which a solar plate carrying the photovoltaic solar cells is mounted, the solar plate being affixed to the upper surface of the roofing tile and formfittingly engageable therewith so that, at least at two opposite sides or edges, the material of the roofing tile projects beyond the photovoltaic cells so that the roofing tile can engage over a region, especially an edge of the solar plate, and the solar plate is thereby secured against lifting from the tile.

More particularly, the roofing tile assembly of the invention comprises:

a rigid roofing tile consisting of a full-surface tile plate composed of a material selected from the group which consists of clay, ceramic, concrete, synthetic resin and hardened composites, the plate being formed with rabbet and rib formations interlockable with adjacent roofing tiles of corresponding assemblies to form a weather-tight roof covering;

a solar plate having a plurality of photovoltaic solar cells mounted on the tile plate, the solar plate having two opposite edges, the tile plate being formed unitarily with formations engaging over the opposite edges along at least a portion of the lengths thereof for retaining the solar plate on the roofing tile against forces tending to lift the solar plate therefrom.

The fastening techniques which can be employed advantageously should permit manufacture of the roofing tile by conventional roofing tile fabrication techniques and such that the roofing tile, even without the photovoltaic module, can be used as a roof covering.

On the one hand this permits a retrofitting of the modules to the roofing tiles after the mounting of the roofing tiles on the roofing and, on the other hand, it ensures visual uniformity of the roofing since those fields of the roofing provided with the photovoltaics will appear to be identical to those fields which do not have the photovoltaic modules.

According to one aspect of the invention, the solar plate itself engages beneath the roofing tile, i.e. engages the roofing tile from below. In this case, the solar plate can be provided laterally, along opposite edges, with lateral brackets engaging opposite edges of the tile. A very simple construction, assembly and mounting in this arrangement can be obtained when the solar plate can be slid in its plane into interfitted engagement with the tile plate.

According to a feature of the invention, the tile plate can be formed on its underside as well as on its upper surface in the region in which it is overlapped or overlaps neighboring roof tiles, with the usual roof tile ribs, rabbets, channels and folds.

In another aspect of the invention, the upper side of the tile plate can be formed as a concave recess at upper edges of which the solar plate is engaged, thereby providing an especially simple and reliable attachment of the solar plate. Since the solar plate spans across the concave recess, the recess serves as a duct for the cooling of the rear of the solar plate and for ventilation thereof. The recess also forms a cable duct through which cabling for the photovoltaic modules can pass.

The upper edges of the concave recess can continuously or partially engage over the edges of the solar plate and it has been found to be advantageous to form the opposite edges of the tile plate with flute, groove, or channel configurations formfittingly receiving the opposite edges of the solar plate.

It has been found to be especially advantageous for fabrication of the assembly and its manipulation, to make the solar plate so that it is at least limitedly bendable and deflectable into the recess at least sufficiently to enable the opposite edges of the solar plate to snap below the opposite edges of the tile plate and engage in grooves formed unitarily in the tile plate below the opposite edges thereof and forming flute, groove or channel configurations.

The recess can have the configuration of a cylinder segment whose axis is parallel to the dip line of the roofing tile.

As noted, it has been found to be advantageous to use the hollow space formed by the recess covered by the solar plate as a cable and/or ventilation passage for the solar plate. Good cooling can be achieved with a simple configuration of the duct when the recess is so dimensioned with respect to the solar plate that the solar plate leaves the recess open at upper and lower regions of the tile. For example, the formation of the upper opening of the solar plate from the recess can be achieved simply by not covering the recess with the solar plate in its upper region.

It has been found to be advantageous to provide, in the region of the lower opening in the recess wall, a slit or notch into which an electrical connection cable for the photovoltaic modules can be inserted.

To prevent the module from slipping out of the tile plate, at least one projection can be provided in the rim of the recess which can engage in a recess in the edge of the solar plate. It also may be of advantage to adhesively bond or cement the solar plate in or on the tile plate over the recess.

An especially advantageous additional or alternative fastening technique has the tile plate provided with a plurality of projections, preferably pins or studs, which engage in correspondingly-shaped openings of the solar plate. Alternatively or in addition, the solar plate may have a plurality of projections, especially studs or pins, which can engage in correspondingly-shaped openings in the tile plate.

From an architecturally aesthetic of view, it has been found to be advantageous to provide the portion of the tile extending along the dip line and which is not covered by either the solar plate or an adjoining tile, as a longitudinal bead which is curved in an upwardly-convex manner. In addition, the optical characteristics of the roofing have been found to be improved when the solar plate has a textured, structured and/or a soft reflective upper surface.

Long useful life of the solar cell components requires that the solar cells not become unduly soiled and thus lose their efficiency. According to the invention, therefore, the solar plate can be provided with antiadhesive, soil-shedding coating, e.g. of a silicone or other material having a low coefficient of sliding friction. Good optical qualities over long periods of time can be achieved, when, in addition, the solar plate has an herbicidal, fungicidal and/or moss growth-preventing coating.

It has also been found to be advantageous to provide the solar plate in the upper portion of the roofing tile that it be so spaced from the front edge of the overlying tile that this front edge of the overlying tile will not cast a shadow on the solar cells of the underlying tile.

An optimal appearance can be obtained when the middle field roofing tiles and the entire tile assembly system has substantially the same color as the solar plates. It is especially advantageous for the tile assembly system to have the same reflectivity values in those areas provided with or free from the solar plates.

Furthermore, the roof run-off edges of the solar plate should have no beads or water-deflecting or water-damming edges.

BRIEF DESCRIPTION OF THE DRAWING

The above and other objects, features and advantages of the present invention will become more readily apparent from the following description, reference being made to the accompanying drawing in which:

FIG. 6A is a side elevational view of the embodiment of FIG. 6;

FIG. 6B is a side elevational view of another side of this assembly showing the connection of the tile thereof with an adjoining tile;

SPECIFIC DESCRIPTION

Figure 3A:
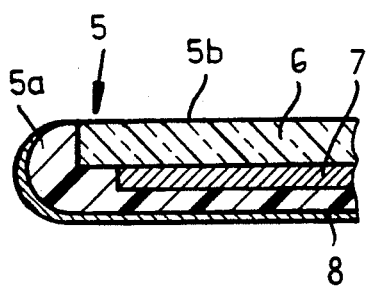
FIG. 3A is a diagrammatic section through the solar plate at an edge thereof engaged in a groove of the tile plate.

The photovoltaic roofing tile system of the invention is comprised of two main components. The base element is a centerfield roof tile 1 of the traditional toothed, ribbed and grooved overlapping construction. The front surface 2 of the roof tile or tile plate 1 has a partially cylindrical trough 3. As can be seen from FIG. 2, for example, the trough 3 is flanked by a bead 1c and a ledge 1g formed with a groove 1h adapted to receive a projection 1i of an adjoining tile when the tiles are overlappingly interfitted. The tile plates have ribs 1j on their underside and ledges or ribs 1k which can be overlapped by other ledges on the underside of a tile disposed above the tiles shown in FIG. 1.

The recessed trough forms a channel or duct which is open forwardly and upwardly and rises rearwardly in an upwardly rounded portion 3a. In the two longitudinal flanks of the recess 3 there are formed undercut grooves 4 with horizontal formations or corrugations to receive the two lateral edges of the frameless photovoltaic module 5 constituting the second main component of the system (see FIGS. 3–4).

Figure 2:
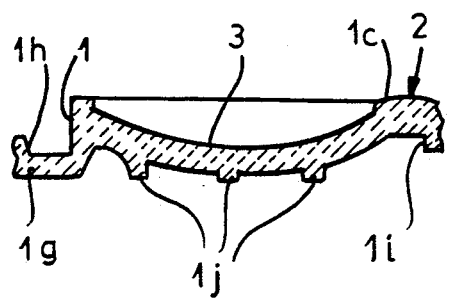
FIG. 2 is a cross section through the tile of the assembly of FIG. 1.
Figure 1:
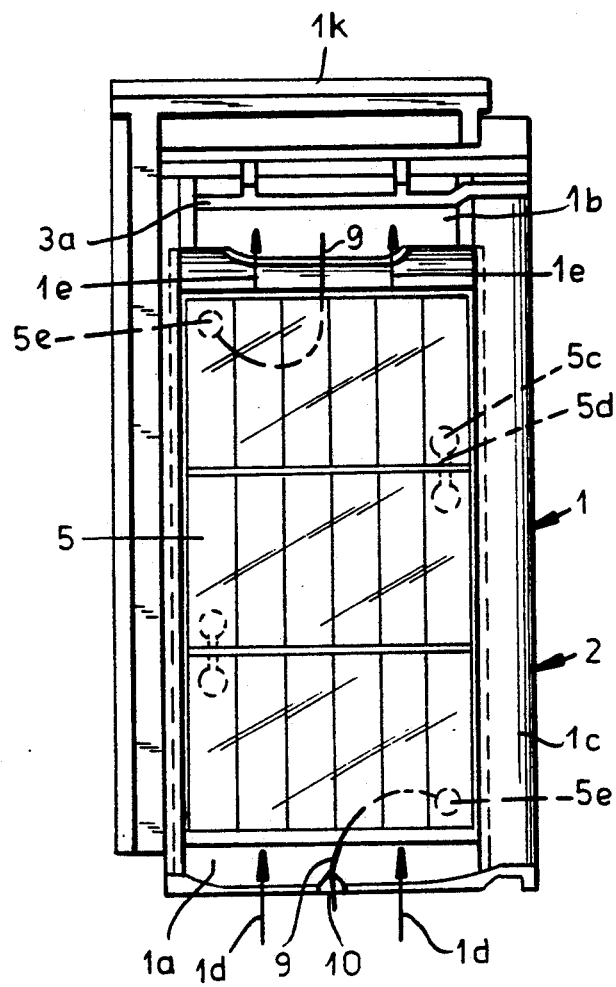
FIG. 1 is a front elevational view of a tile assembly according to the invention having a solar plate attached to the tile plate thereof.

The roof tile 1, seen in section in FIG. 2 and without the module, has the configurations and dimensions of a conventional ceramic or like roofing tile and the assembly shown in FIG. 1 and adjoining roofing tiles with or without photovoltaic modules can be emplaced by local roofers using traditional hand tile emplacement techniques under German Industrial Standards, for example. The total roof covering of the house or plating may be composed of this roof tile construction and made weather-tight, so as to prevent rain and snow from entering. The overall roof system, has, for example, the tiles including, with entry, peak and ventilating half tiles, all of which can be composed of tile elements with identical reflectivity and the same reflecting characteristics and coloration as those of the central field tile shown in the drawing.

The total tile system, therefore, can be solar cell blue with the same reflection values as the photovoltaic modules to ensure uniformity and optical harmony of the roof.

Architecturally aesthetic results are best achieved when the roof surface is subdivided into fall lines or dip lines and the longitudinal ledge portion 1c of the tile 1 which is not covered by the solar plate 5 or adjoining tile extends along one of these dip lines and is convex upwardly with a curved surface (see FIGS. 1 and 2).

The photovoltaic module 5 can comprise a pane 6 of chemically-hardened iron-free high-light-transparency glass of a thickness of 1.5 to 2.0 mm, i.e. a relatively thin pane.

Below this pane 6, solar cells 7 are disposed in a shingled pattern, laminated in weather-resistant synthetic resin foils. The solar cell assembly and the pane thus are embedded in synthetic resin 5a (see FIG. 3A) with the embedding material extending around edges of the glass pane 6. This special laminating technique ensures that no frames are required and guarantees mechanical and chemical edge protection of the glass pane 6. The edge protection can be profiled to provide a frame-tight adaptation of the module 5 to the roof tile 1. On the lower back surface of the photovoltaic module 5, a black foil 8 with a high temperature-emission coefficient is provided for rapid rearward conduction of the heat from the solar cells 7. This construction ensures that the daily and year-round efficiency of the photovoltaic roofing tile system will be relatively high.

The solar plate has no rain-shedding edges having bead-like water-damming formations. The roofing tile and the roofing tile system has preferably the same coloration as the solar plate although it may have a different coloration if desired. In either case, the solar plate and the roofing time have the same reflectivity values. In the preferred configuration, the solar plate is reflection-free.

In a particularly advantageous configuration, three rows of solar cells 7 in an overlapping shingling array, each row having six individual cells of dimensions of $25 \times 100 \times 0.2$ mm can be embedded in the module 5.

The overlapping shingling technique for the solar cells 7 ensures an optically uniform metallic blue appearance without visible silver contact strips. With the use of 18 high-power solar cells 7 in the configuration described, optimal current generation without high losses can be ensured. The open circuit voltage is about 9 volts and the working voltage is about 6 volts. With an efficiency of 14%, the module can generate in full sunshine (1 kw/m$^2$) a power of 6.3 watts. For a roof surface of an area of 1m$^2$, 14.5 roofing tile assemblies according to the invention are required for yielding a power of 91.3 watts for each m$^2$ of roof coverage.

The electrical connections for the solar cells 7 are formed by cables 9 colored to conform to the coloration of the solar cells and which extend from the laminated assembly of FIG. 3A with a weather-tight seal therewith. The electrical connections of the modules 5 to one another can be effected by crimp connectors and soldering and then sealing of the soldered crimp connectors with highly weather-resistant shrink tubing. This ensures long-term operation without current and efficiency losses.

Within the module, solder connections 5d between solder spots 5c can be provided. The cables 9 can derive from solder spots 5e (see FIG. 1).

In each cable connection for the roofing tile module of the invention, reverse current diodes are provided. The reverse current diodes guarantee, upon partial shading of the roofing tile, the functional reliability of the current-generation modules.

It is possible to form the entire roof traditionally with roofing tiles according to the invention without the photovoltaic modules using traditionally-trained roofers.

The photovoltaic modules can then be inserted into the center field roofing tiles by a photovoltaic electrician to retrofit the roof with the photovoltaic modules in place and electrically cable the modules together.

The modules 5 are sufficiently flexible so that finger pressure upon a module placed upon the roofing tiles will bend the module inwardly into the trough 3, thereby reducing the effective width of the photovoltaic module. The edges of the module than snap past the edges 4a of the longitudinal grooves 4 to allow the opposite edges of the module to snap into these grooves. By the corrugations or teeth described below in connection with FIG. 5, the modules 5 are held in place in the grooves in a storm-resistant and aging-resistant manner.

The photovoltaic module 5 thus forms a duct with the recess 3. The internal height of this duct can be about 25 mm and its width can be about 160 mm. In the forward direction, the duct is open forwardly. The photovoltaic module is so constructed that it is about 20 mm shorter than the trough formed in the tile plate 1.

As a result, a horizontal duct opening 1b is formed in the rear portion of the tile plate. This rear opening 1b lies about 25 mm ahead of the vertical duct opening 1a of the overlying tile. As a consequence, the forward edge of the overlapping tile lies about 25 mm from the underlying photovoltaic module and ensures, for inclined roofs and vertical sun's rays, an absence of shading of the photovoltaic module by the overlying tile. The year-round efficiency of the system is thereby significantly increased.

The duct has two functions.

Firstly, it functions as a ventilation passage for carrying away the heat of the solar cells.

Secondly it forms a cable passage for the electrical connection of the tiles together.

The flow of air through the duct is represented by the arrows 1d showing the incoming airflow and the arrows 1e showing the outgoing airflow.

Each tile 1 has its own passage defined by its trough 3. The troughs 3 of the adjoining tile do not, however, connect with one another. A small groove or notch 10 at the front edge of the tile serves to fix the cable 9 in place without movement so that in the case of storms, the cable 9 will not break free and produce a flapping noise.

The weight of each photovoltaic roofing tile assembly is about 3.5 kg and this guarantees a weather-resistant positioning of the tile on the strut construction of the roof. By and large, the photovoltaic modules are maintenance-free and have long-term stability. They may have a coating 5b of a low-friction material such as a silicone, to facilitate the shedding of dirt therefrom.

Should a mechanical defect develop in one of the photovoltaic modules, its removal and replacement is no problem since a module can be removed by simply pulling it out of the respective tile, splicing a new one in the circuit and pressing the new module into the tile. The upward bulging of the photovoltaic module to be removed enables it to snap out of the grooves 4.

Additional photovoltaic modules can be mounted in tiles which are originally placed without such modules without modifying the roof or requiring a new roof covering. Hence the number of photovoltaic modules can always be adjusted in accordance with the financial capacity of the owner and the electrical needs of the occupants.

The two-component technology of the photovoltaic roof tile system of the invention enables conventional roofing of a house with later retrofitting and stepwise installation of photovoltaic modules to supply the present or future energy requirements by solar energy.

Figure 5:
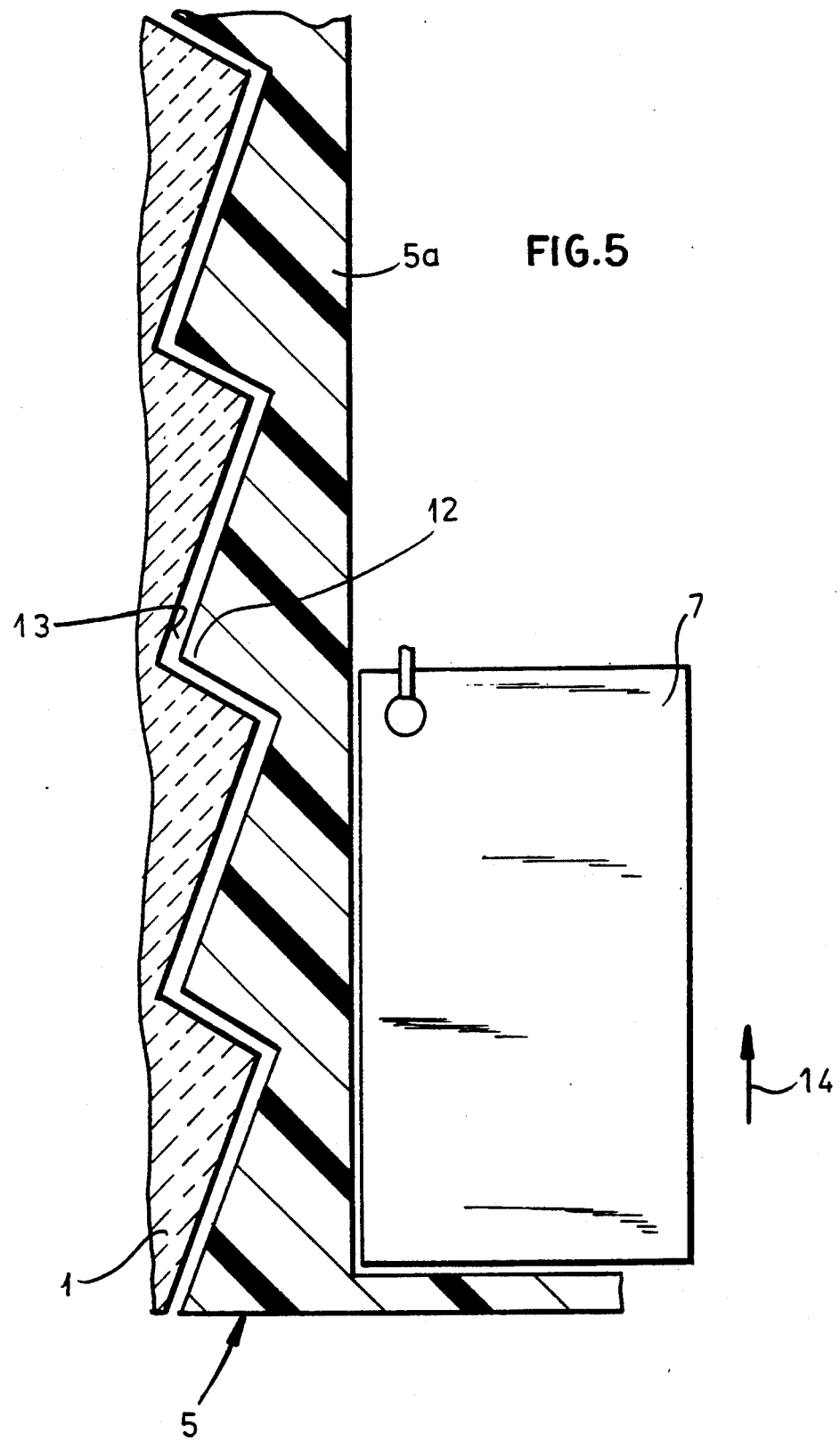
FIG. 5 is a cross sectional view through the tile plate and a portion of the solar plate along an edge of the latter taken in the plane of the solar plate.

FIG. 5 illustrates an embodiment of the system of FIGS. 1 through FIGS. 3 and 3A in which the edges of the modules 5 received in the grooves 4 are formed with tooth-like projections or serrations 12, preferably of a saw-tooth configuration. These teeth can engage in recesses 13 of the grooves 4 which can be of complementary configuration. The solar plate can thus be inserted in the grooves 4 from below and pressed upwardly in the direction of the arrow 14. The serrations 12 and the recesses 13 form an anchoring system which prevents the module from readily being released from the tile and allows simple insertion of the solar plate.

The recesses 13 can be eliminated when the serrations 12 can engage a smooth wall of the groove 4. In that case, the serrations 12 bite into the material of the grooves 4.

Figure 3:
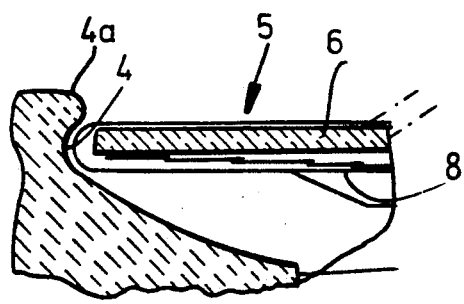
FIG. 3 is a section through FIG. 1 illustrating one embodiment for securing the solar plate in place.
Figure 4:
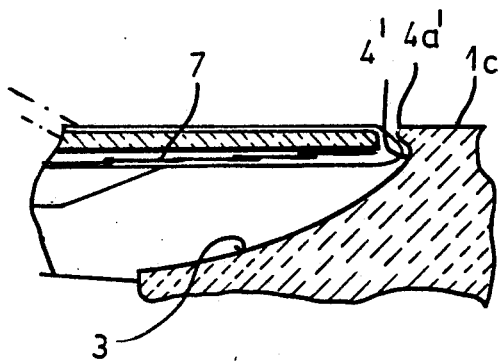
FIG. 4 is a view similar to FIG. 3 showing a second embodiment.

In FIG. 4, the configuration of the groove 4' and of the overhang 4a' is slightly different from that of the groove 4 of FIG. 3.

Figure 6:
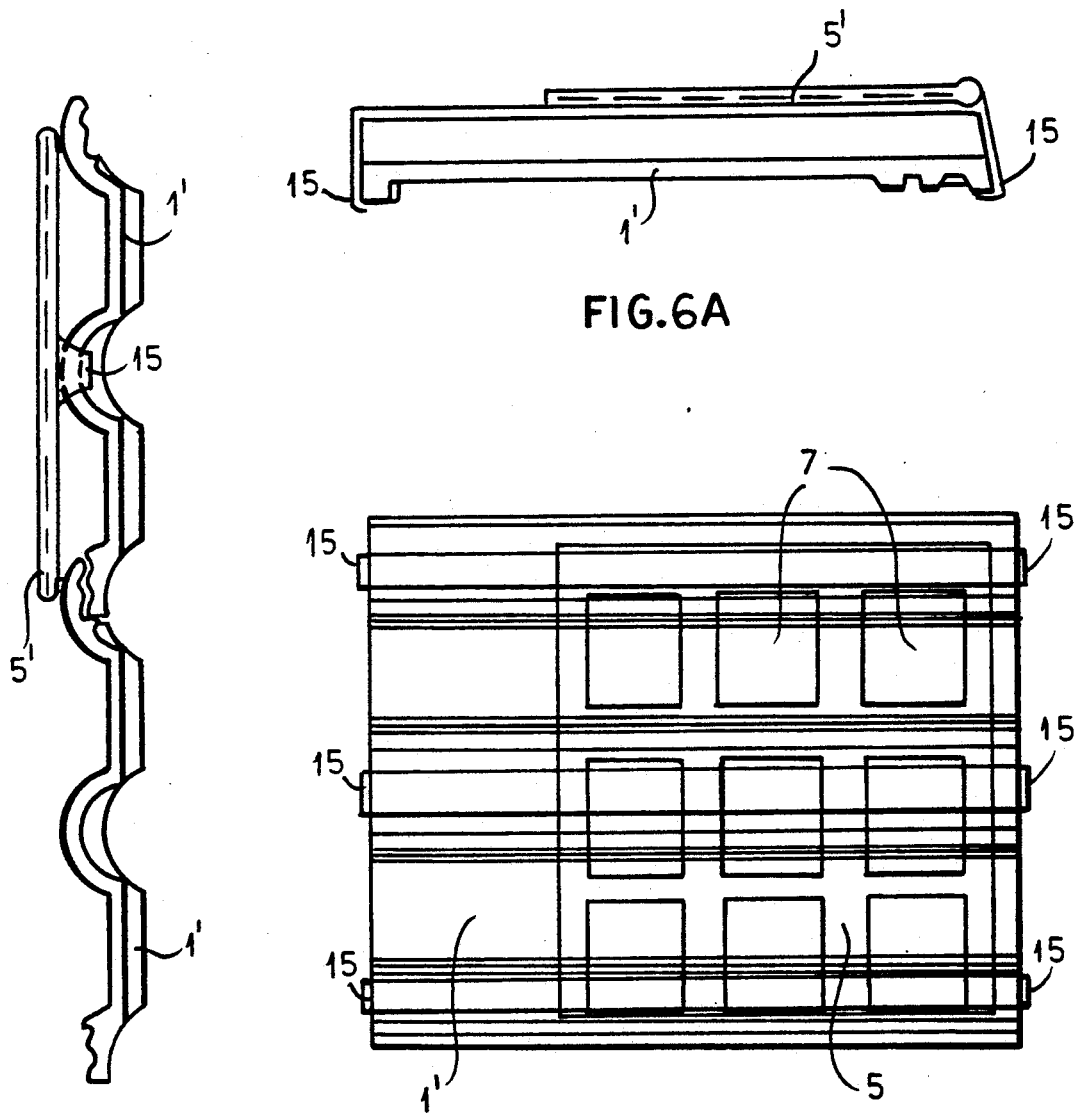
FIG. 6 is a plan view of a roofing tile assembly on which the solar plate is affixed by brackets.

FIGS. 6, 6A and 6B show a type of fastening in which the photovoltaic module 5' is provided with lateral brackets 15 of metal and which can engage over the opposite edges of the tile, preferably the upper and lower edges thereof so that the tile is gripped from below. The tile 1' of this embodiment, of course, has a corrugated configuration best seen in FIG. 6B.

Figure 7:
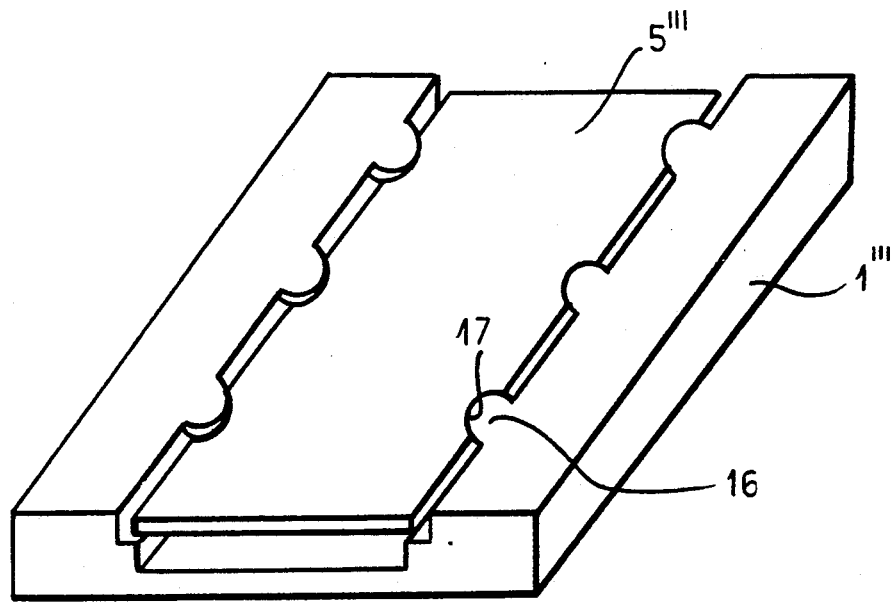
FIG. 7 is a perspective view of a roofing tile having arc-segmental projections retaining the solar plate in place.
Figure 8:
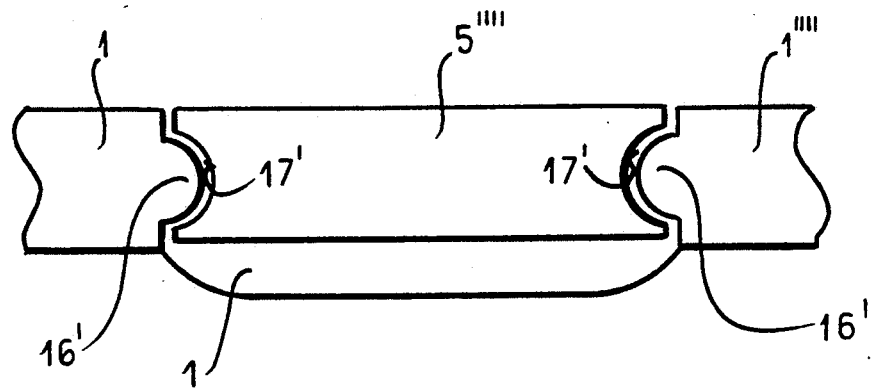
FIG. 8 is a section through a roofing tile with bead-like projections engaging in lateral grooves of the solar plate.

In the embodiments of FIGS. 7 and 8, the portions of the tiles 1''' and 1'''' which engage over the photovoltaic modules 5''' and 5'''' do not extend continuously over the lengths of the edges but are relatively short projections or tongues 16 which can engage in corresponding recesses or openings 17 of the solar plate 5''' or 5''''. In the embodiment of FIG. 7, the projections 16 are formed on the upper surface of the tile whereas the projections 16' and the pockets 17' receiving them are formed intermediate the upper and lower surface of the photovoltaic module 5'''' in the embodiment of FIG. 8.

I claim:

1. A roofing tile assembly, comprising:
   a rigid roofing tile consisting of a full-surface tile plate composed of a material selected from the group which consists of clay, ceramic, concrete, synthetic resin, and hardened composites, said plate being formed with rabbet and rib formations interlockable with adjacent roofing tiles of corresponding assemblies to form a weather-tight roof covering;
   a solar plate having a plurality of photovoltaic solar cells mounted on said tile plate, said solar plate having two opposite edges, said tile plate being formed unitarily with formations engaging over said opposite edges of said solar plate along at least a portion of the lengths thereof for retaining said solar plate on said roofing tile against forces tending to lift said solar plate therefrom.

2. The assembly defined in claim 1 wherein said formations are opposite edges of said tile plate and said solar plate is formed along said edges of said solar plate with lateral brackets engaging beneath said edges of said tile plate.

3. The assembly defined in claim 1 wherein said formations are constructed and arranged to enable engagement of said formations with said solar plate by sliding movement of said solar plate onto said tile plate in a plane of said solar plate.

4. The assembly defined in claim 1 wherein said tile plate is formed on its underside and upper surface with standard roofing tile ribs and grooves.

5. The assembly defined in claim 1 wherein said tile plate is formed on an upper surface thereof with a concave recess having a pair of opposite edges providing said formations and engaging said solar plate.

6. The assembly defined in claim 5 wherein said opposite edges of said tile plate have flute, groove, or channel configurations form-fittingly receiving said opposite edges of said solar plate.

7. The assembly defined in claim 6 wherein said opposite edges of said solar plate have sawtooth configurations.

8. The assembly defined in claim 7 wherein said configurations of said tile plate have sawtooth formations mating with said sawtooth configurations of said solar plate.

9. The assembly defined in claim 5 wherein said solar plate is at least limitedly bendable so as to be deflectable into said recess at least sufficiently to enable the opposite edges of said solar plate to snap below said opposite edges of said tile plate and engage in grooves formed unitarily in said tile plate below said opposite edges thereof.

10. The assembly defined in claim 5 wherein said recess is only partly covered by said solar plate and is open outwardly at upper and lower regions of said tile plate.

11. The assembly defined in claim 10 wherein an upper opening is formed at said upper region by leaving a portion of said recess uncovered by said solar plate.

12. The assembly defined in claim 11 wherein, at said lower region, a wall of said recess is formed with a slit or notch passing an electrical connection cable for said solar cells.

13. The assembly defined in claim 5 wherein said solar plate is adhesively bonded to said tile plate at said recess.

14. The assembly defined in claim 1 wherein said tile plate is provided with a multiplicity of projections engaging in respective recesses in said solar plate.

15. The assembly defined in claim 1 wherein said solar plate is provided with a multiplicity of projections engaging in respective recesses in said tile plate.

16. The assembly defined in claim 1 wherein said tile plate has a longitudinal edge not covered by said solar plate and an adjoining assembly of upwardly domed bead configuration.

17. The assembly defined in claim 1 wherein said solar plate and said tile plate have the same reflectivity.

18. The assembly defined in claim 17 wherein said solar plate and said tile plate have the same color.

19. The assembly defined in claim 18 wherein said solar plate is a frameless solar plate comprising a glass plate, a multiplicity of solar cells laminated together in a solar cell assembly below said glass plate, a potting layer of synthetic resin extending around said solar cell assembly and over at least edges of said glass plate, and a black backing foil.

* * * * *